US009311965B2

(12) United States Patent
Hwang

(10) Patent No.: US 9,311,965 B2
(45) Date of Patent: Apr. 12, 2016

(54) METHOD AND APPARATUS FOR CONTROLLING A DISPLAY OF MULTIMEDIA CONTENT USING A TIMELINE-BASED INTERFACE

(75) Inventor: Sung-Jae Hwang, Daejeon (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 0 days.

(21) Appl. No.: 13/483,357

(22) Filed: May 30, 2012

(65) Prior Publication Data
US 2012/0308204 A1 Dec. 6, 2012

(30) Foreign Application Priority Data

May 31, 2011 (KR) .................. 10-2011-0052006

(51) Int. Cl.
| | | |
|---|---|---|
| H04N 5/775 | (2006.01) | |
| G11B 27/34 | (2006.01) | |
| G06F 3/0484 | (2013.01) | |
| G06F 3/0488 | (2013.01) | |
| G11B 27/10 | (2006.01) | |

(52) U.S. Cl.
CPC .............. *G11B 27/34* (2013.01); *G06F 3/0488* (2013.01); *G06F 3/04847* (2013.01); *G11B 27/102* (2013.01); *G06F 2203/04805* (2013.01)

(58) Field of Classification Search
CPC ..................... H04N 21/47217; G06F 3/04847; G06F 3/0488; G06F 2203/04805; G11B 27/102
USPC .................. 386/282, 344, 343, 231, 248, 230
See application file for complete search history.

(56) References Cited

U.S. PATENT DOCUMENTS

| | | | | | |
|---|---|---|---|---|---|
| 3,762,799 | A | * | 10/1973 | Shapiro | 359/442 |
| 4,790,028 | A | * | 12/1988 | Ramage | 382/298 |
| 5,638,523 | A | * | 6/1997 | Mullet et al. | 715/855 |
| 5,670,984 | A | * | 9/1997 | Robertson et al. | 345/585 |
| 6,073,036 | A | * | 6/2000 | Heikkinen et al. | 455/550.1 |
| 6,417,867 | B1 | * | 7/2002 | Hallberg | 345/660 |
| 6,572,476 | B2 | * | 6/2003 | Shoji et al. | 463/33 |
| 6,633,305 | B1 | * | 10/2003 | Sarfeld | 345/671 |
| 6,816,174 | B2 | * | 11/2004 | Tiongson et al. | 715/787 |
| 6,922,816 | B1 | * | 7/2005 | Amin et al. | 715/833 |
| 6,931,594 | B1 | * | 8/2005 | Jun | 715/719 |
| 7,380,216 | B2 | * | 5/2008 | Feig et al. | 715/786 |
| 7,443,396 | B2 | * | 10/2008 | Ilic | 345/440.1 |
| 7,760,187 | B2 | * | 7/2010 | Kennedy | 345/173 |

(Continued)

FOREIGN PATENT DOCUMENTS

| | | |
|---|---|---|
| CN | 1723431 A | 1/2006 |
| CN | 101842768 A | 9/2010 |

(Continued)

OTHER PUBLICATIONS

Henshaw et al, "Magnified Slider Control—Magnified Dial Control", IBM Technical Disclosure Bulletin #RA892-0391, vol. 36, No. 8, Aug. 1993, pp. 9-10.*

*Primary Examiner* — David Harvey
(74) *Attorney, Agent, or Firm* — Cha & Reiter, LLC.

(57) ABSTRACT

A touch screen control method for controlling a playback of multimedia content using a timeline-based interface includes detecting a selection at a specific location on the timeline; and selectively zoom-displaying an area around the location where the selection is detected the position on the timeline where the event trigger has occurred.

20 Claims, 7 Drawing Sheets

(56) References Cited

U.S. PATENT DOCUMENTS

| | | | |
|---|---|---|---|
| 8,032,843 B2 * | 10/2011 | Ording et al. | 715/862 |
| 8,218,895 B1 * | 7/2012 | Gleicher et al. | 382/275 |
| 8,224,392 B2 * | 7/2012 | Kim et al. | 455/566 |
| 8,237,666 B2 * | 8/2012 | Soo et al. | 345/173 |
| 8,253,704 B2 * | 8/2012 | Jang | 345/173 |
| 8,954,899 B2 * | 2/2015 | Wu et al. | 716/53 |
| 2002/0063737 A1 * | 5/2002 | Feig et al. | 345/786 |
| 2002/0107886 A1 | 8/2002 | Gentner et al. | |
| 2005/0086703 A1 * | 4/2005 | Gupta et al. | 725/135 |
| 2005/0091596 A1 * | 4/2005 | Anthony et al. | 715/712 |
| 2005/0134610 A1 * | 6/2005 | Doyle et al. | 345/647 |
| 2005/0162447 A1 * | 7/2005 | Tigges | 345/661 |
| 2006/0022955 A1 * | 2/2006 | Kennedy | 345/173 |
| 2006/0078226 A1 * | 4/2006 | Zhou | 382/298 |
| 2007/0033543 A1 * | 2/2007 | Ngari et al. | 715/788 |
| 2007/0097151 A1 * | 5/2007 | Rosenberg | 345/660 |
| 2007/0198111 A1 * | 8/2007 | Oetzel et al. | 700/94 |
| 2008/0034316 A1 | 2/2008 | Thoresson | |
| 2008/0094367 A1 * | 4/2008 | Van De Ven et al. | 345/173 |
| 2008/0141165 A1 | 6/2008 | Feig et al. | |
| 2008/0143877 A1 * | 6/2008 | Urabe et al. | 348/556 |
| 2008/0165141 A1 | 7/2008 | Christie | |
| 2008/0307345 A1 | 12/2008 | Hart et al. | |
| 2009/0167685 A1 * | 7/2009 | Wrubel | G09G 5/06 345/163 |
| 2009/0187825 A1 * | 7/2009 | Sandquist et al. | 715/719 |
| 2009/0199119 A1 * | 8/2009 | Park et al. | 715/765 |
| 2009/0282362 A1 * | 11/2009 | Matsumoto | 715/787 |
| 2010/0045702 A1 * | 2/2010 | Doyle et al. | 345/641 |
| 2010/0150522 A1 * | 6/2010 | Schmehl | 386/68 |
| 2010/0156830 A1 * | 6/2010 | Homma et al. | 345/173 |
| 2010/0162170 A1 * | 6/2010 | Johns | G04G 9/06 715/834 |
| 2011/0145745 A1 * | 6/2011 | Hyeon et al. | 715/769 |
| 2011/0185296 A1 | 7/2011 | Lanier et al. | |
| 2011/0195710 A1 | 8/2011 | Nas et al. | |
| 2012/0062473 A1 * | 3/2012 | Xiao | H04N 5/76 345/173 |
| 2012/0131453 A1 * | 5/2012 | Pechanec et al. | 715/702 |
| 2012/0159370 A1 * | 6/2012 | Rode et al. | 715/772 |
| 2012/0308204 A1 * | 12/2012 | Hwang | 386/241 |
| 2014/0075315 A1 | 3/2014 | Karlsson | |

FOREIGN PATENT DOCUMENTS

| | | | |
|---|---|---|---|
| EP | 1924089 | * | 5/2008 |
| EP | 2088502 | * | 8/2009 |
| EP | 2088502 A2 | * | 12/2009 |
| GB | 2462171 A | * | 3/2010 |
| JP | 2007-280316 | * | 10/2007 |
| JP | 2010-237928 | * | 10/2010 |
| JP | 2010237928 A | * | 10/2010 |
| KR | 10-2009-0085777 A | | 8/2009 |
| KR | 2009093532 A | * | 9/2009 |
| KR | 10-2011-0010935 A | | 2/2011 |
| KR | 10-1073057 B1 | | 10/2011 |

* cited by examiner

METHOD AND APPARATUS FOR CONTROLLING A DISPLAY OF MULTIMEDIA CONTENT USING A TIMELINE-BASED INTERFACE

CLAIM OF PRIORITY

This application claims the benefit under 35 U.S.C. §119 of a Korean Patent Application filed in the Korean Intellectual Property Office on May 31, 2011 and assigned Serial No. 10-2011-0052006, the entire disclosure of which is incorporated herein by reference.

BACKGROUND OF THE INVENTION

1. Field of the Invention

The present invention relates to a method and apparatus for controlling a display of pre-recorded content on a touch screen via a timeline-based interface.

2. Description of the Related Art

The term 'touch screen' or 'touch panel' refers to a user interface device that detects a touch position where a user touches letters displayed on a screen or a specific position on the screen with an input means such as a fingertip and a touch pen without using a keyboard, and performs a specific operation using stored software responsive to the detected touch position information. For this user interface device, in most cases, a user's fingertip is used as the input means which may cause an inaccuracy due to the large area of user's fingertip.

As a solution to this problem, a hardware solution such as a stylus pen has been proposed. Disadvantageously, however, the user must purchase a stylus pen separately, which can be easily lost, and must use his or her both hands to handle the stylus pen.

In a portable terminal, a timeline slider is widely used as a means for content manipulation such as Play, Rewind, and Fast Forward for video.

Generally, the timeline slider includes a straight bar corresponding to the full range of content or the full range of manipulation parameters (e.g., sound, brightness, etc.), and a slider indicating the current content playback position. As such, the user can readily adjust the content playback position by shifting or sliding the slider position with his or her fingertip.

However, due to the fixed timeline's scale and the large user's fingertip, the user experiences many difficulties in manipulating the content at his or her desired high accuracy.

To solve the above problem, various touch screen control methods have been proposed, including a user gesture-based touch screen control method, a multi-scale timeline-based touch screen control method, and a navigation button-based touch screen control method. However, currently there is no proposed scheme to efficiently adjust the scale of the timeline in the timeline area which may enhance the accuracy.

Recently, technology for adjusting a multi-scale timeline bar depending on the directional user drag has been proposed. Disadvantageously, however, in this method, the user drag needs to get out of the timeline bar area for dynamic scaling, and also the full timeline may not be displayed in a predetermined area. In particular, due to the decreasing size of the touch screen and the increasing capacity of the content, the user may feel significant discomfort in manipulating the timeline bar with a fixed scale.

Therefore, there is a need for new interference technology that can accurately manipulate and adjust multimedia content with less effort.

SUMMARY OF THE INVENTION

An aspect of an exemplary embodiment of the present invention is to provide a touch screen control method and apparatus for allowing a user to freely manipulate and adjust content even on a small touch screen.

Another aspect of an exemplary embodiment of the present invention is to provide a computer-readable recording medium in which a program for implementing the touch screen control method and apparatus is recorded, and a terminal apparatus.

Another aspect of the invention provides a method of controlling a touch screen using a timeline supporting fisheye lens-based dynamic zoom, wherein a scale of a timeline is dynamically changed depending on a touch event preset in the timeline, thus allowing a precise control of a touch screen is possible so that the touch screen is controlled through natural interaction.

In accordance with one aspect of the present invention, a touch screen control method for controlling a playback of content using a timeline tool includes detecting a user contact on for a specific location on the timeline; and selectively zoom-displaying the location on the timeline where the user contact is made. The contact may be detected: when a user contact lasts for a predetermined time or more; when a user gesture having a predetermined gesture pattern is detected; when a user touch pressure having a predetermined pressure level or more is detected; when substantially the same location is touched two or more times within a predetermined time; or when an event trigger request button is selected.

Another aspect of the invention provides an enlarged view of a slider upon detecting a contact on the slider, and the enlarged view of the slider can be in form of a one-dimensional fisheye effect on the X-coordinate, a two-dimensional fisheye effect on the X/Y-coordinates, or a circular fisheye lens effect.

In accordance with further another aspect of the present invention, a touch screen control apparatus for controlling a playback of content using a timeline a controller for displaying the timeline and a slider thereon, and for selectively zoom-displaying a specific area on the timeline where a user contact is detected.

BRIEF DESCRIPTION OF THE DRAWINGS

The above and other aspects, features and advantages of certain exemplary embodiments of the present invention will be more apparent from the following description taken in conjunction with the accompanying drawings, in which.

DETAILED DESCRIPTION OF EXEMPLARY EMBODIMENTS

Preferred embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the embodiments described herein can be made without departing from the scope and spirit of the invention. In addition, descriptions of well-known functions and constructions are omitted for clarity and conciseness.

The term 'timeline' as used herein may refer to an editable program workspace where content such as video clips and audio clips, or consecutive data is placed in order. The timeline includes layers and frames, and has a function of creating a moving animation and music by placing on-screen images and audios with a combination of the layers. Basically, the timeline, a function that makes it possible to consecutively show frames by adjusting positions, sizes and image attributes of objects, may make it possible to effectively edit and manage components by registering the components in different layers and handling them.

Figure 1:
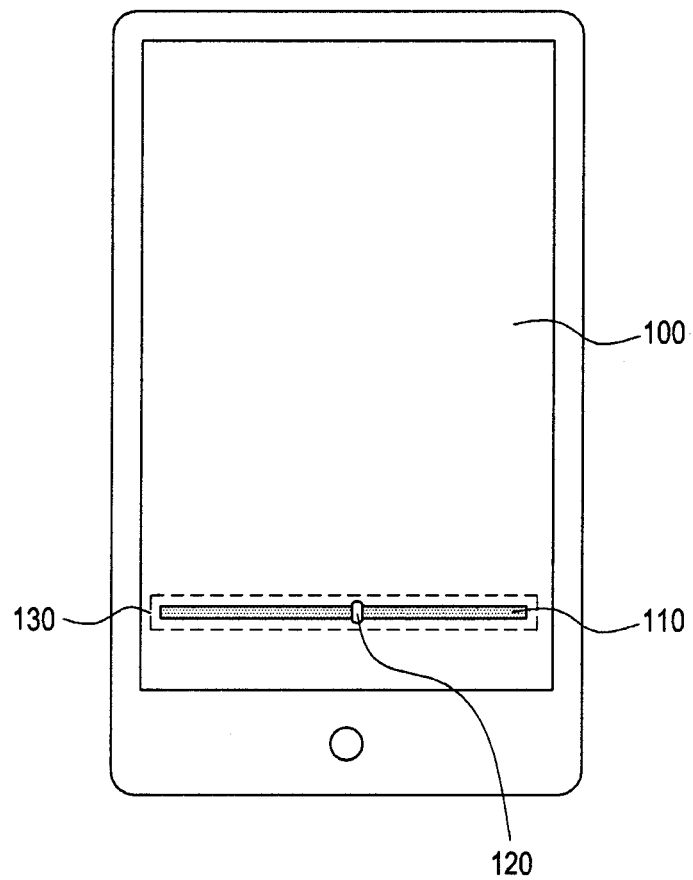
FIG. 1 shows a timeline displayed on a touch screen and used to control playback of content according to an embodiment of the present invention.

FIG. 1 shows a timeline displayed on a touch screen and used to control playback of content according to an embodiment of the present invention.

Referring to FIG. 1, a timeline 130 is represented in a form of in a straight bar 110 to present information, corresponding to a multimedia content on a particular time period. To this end, the timeline 130 includes a slider 120 indicating the position of content currently being displayed on a touch screen 100.

Figure 2:
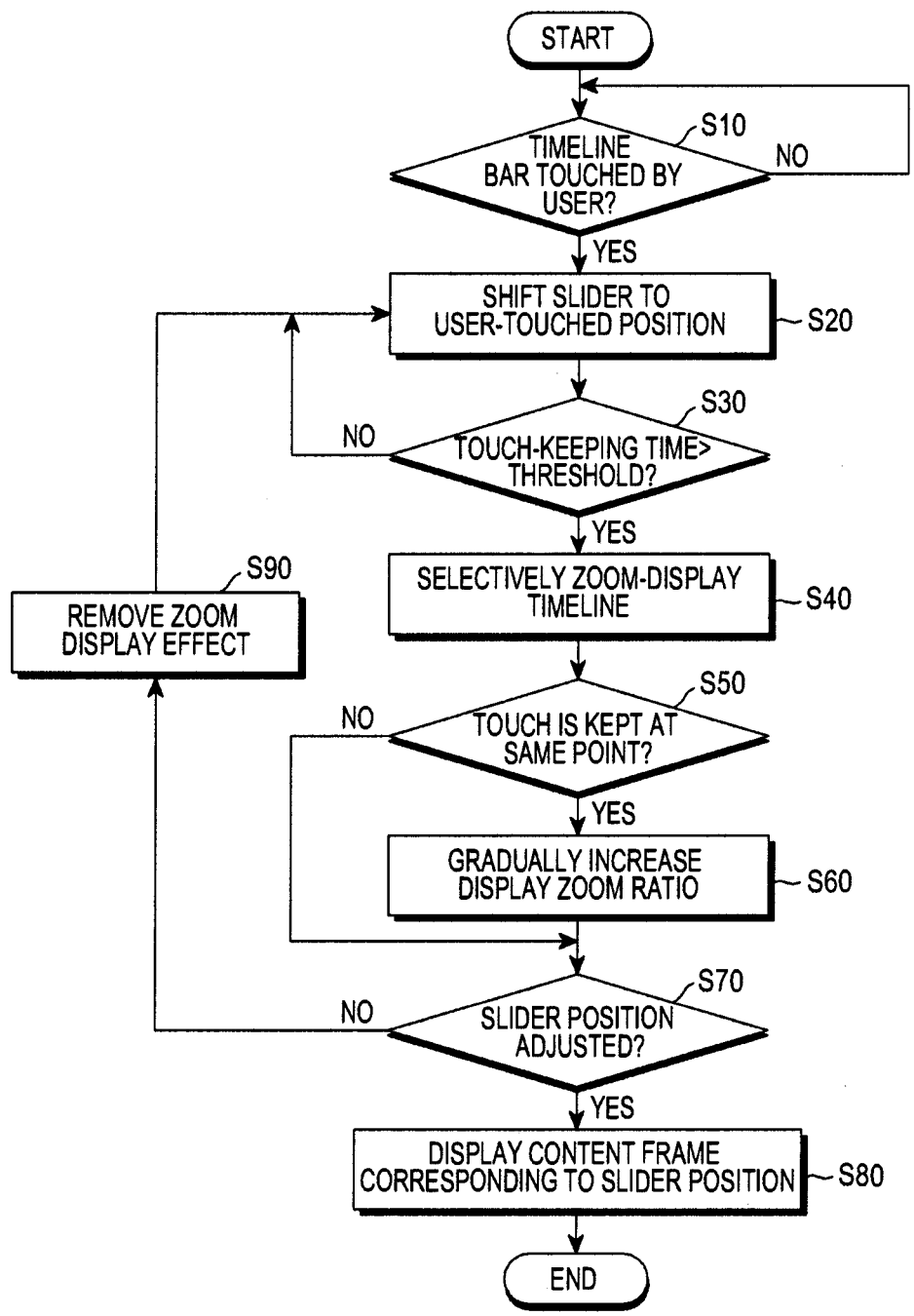
FIG. 2 shows a method for controlling a touch screen according to an embodiment of the present invention.

FIG. 2 shows a method for controlling a touch screen according to an embodiment of the present invention.

If a user touches the bar 110 at a specific location on or near the timeline 130 displayed on the touch screen 100 with a touch input means such as a fingertip or other means in step S10, the slider 120 is shifted to the user-touched position in step S20 and displays the content frame corresponding to the touched location. At this time, if the user contact is maintained at the same location for a predetermined time (e.g., 5 seconds) or more in step S30, the area around the user-touched location are enlarged or zoom-displayed in step S40. In other words, as the user fine tunes (or continuously contacts) the slider 120, a partial area of the timeline bar 110, which includes the user-touched position, is up-scaled and displayed. Here, a display zoom ratio is predetermined.

Alternatively, the slide position adjustment unit may be subdivided depending on a display zoom ratio in step S40, thereby increasing the slider fine-tuning effect. As described in FIG. 3a, a slider region is up-scaled, controller displays the slide position adjustment unit (4:50, 5:00, 5:10). When the slider region is further up-scaled, the slide position adjustment unit is further subdivided. For example, the slider region described in FIG. 3a can be further up-scaled, then the slide position adjustment unit may be subdivided as (4:50, 4:55, 5:00, 5:05, 5:10).

If the user maintains his or her contact continuously on the touch screen at the same point in step S50 even after the zoom display effects are applied and displayed in step S40, the display zoom ratio can further be increased gradually thereafter, thus enlarging the zoom effect thereafter in step S60.

In this state, if the user adjusts the position of the slider 120 in step S70, the content frame corresponding to the adjusted position of the slider 120 is retrieved and displayed on the touch screen 100 in step S80. That is, the user continuously moves the finger to the slider 120 after being up-scaled to control the slider 120.

If the user releases his or her touch, the zoom display effects applied to the user-touched position are removed, and the zoom-displayed bar 110 is restored to its initial form in step S80. Alternatively, the zoom display effects may be released slowly so that the user has an opportunity to go back to the zoom-displayed bar before removed.

Although occurrence of an event trigger is assumed to be detected, for example, when the user touch is maintained for a predetermined time or more according to an embodiment of the present invention for convenience of description, the occurrence of the event trigger may be detected in various different ways depending on the device's input environments. For example, the same effect can achieved (i) when a user gesture having a predetermined gesture pattern is detected, (ii) when a user touch pressure having a predetermined pressure value or more is detected, (iii) when substantially the same position is touched a predetermined number of times or more within a predetermined time, or (iv) when an event trigger request button is selected, or any combination thereof. For reference, the time, the gesture pattern, the pressure value, the number of touches, etc. may be set in advance, and may be arbitrarily changed and reset during operation depending on the device's input environments.

The zoom display effects may be further enlarged by gradually increasing the display zoom ratio in proportion to an event trigger-occurring time (e.g., user touch time) and/or an event trigger-occurring level (e.g., gesture size, user touch pressure value, user touch speed, button selection speed, the number of button selections, etc.).

Further, the proposed touch screen control method may further adjust a display zoom ratio, a display zoom ratio increment unit, and a slide position adjustment unit depending on the size of content. For example, when size of first content is 480×360 and size of second content is 800×600, the display zoom ratio of the second content is bigger than the display zoom ratio of the first content. When the display zoom ratio increment unit of the second content is bigger than the display zoom ratio increment unit of the first content, then the slide position adjustment unit of the second content is bigger than the slide position adjustment unit of the first content.

Figure 3A:
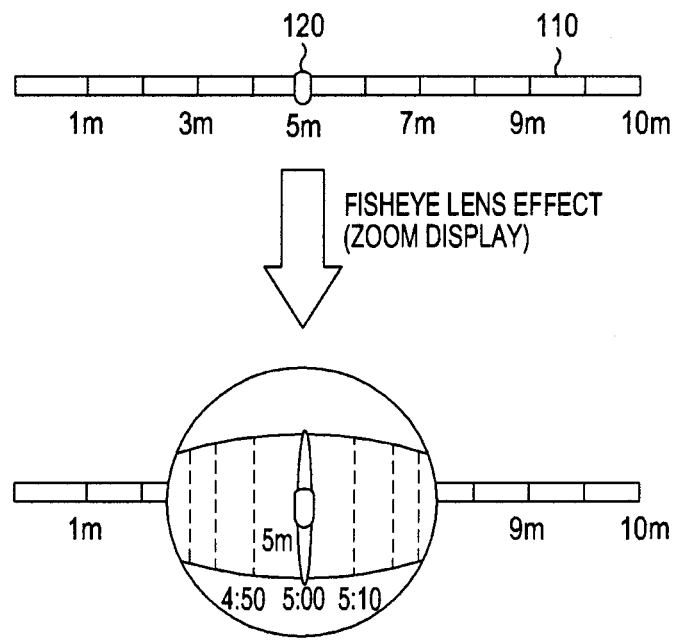
FIGS. 3A to 3C show detailed processes of zoom-displaying a user-touched position according to different embodiments of the present invention.
Figure 3B:
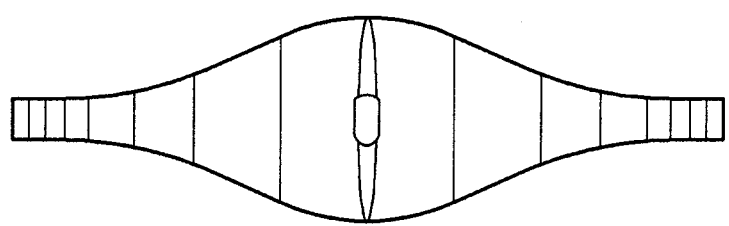
Figure 3C:
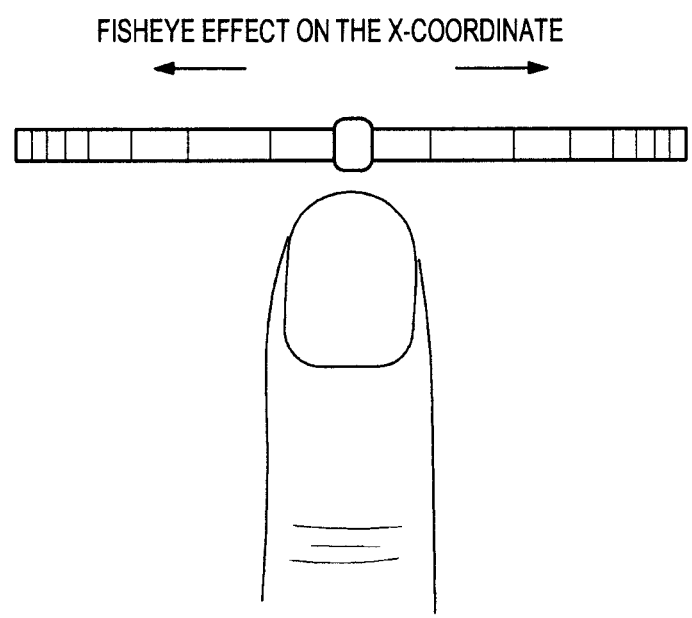

FIGS. 3A to 3C show detailed processes of zoom-displaying a user-touched position according to different embodiments of the present invention.

As shown in FIGS. 3A to 3C, the timeline bar 110 may be selectively zoom-displayed depending on the user-touched position. In particular, the user-touched position is zoomed or distorted the most, and the farther away from the user-touched position, the less the timeline bar 110 is zoomed or distorted.

Specifically, as shown in FIG. 3A, the X-axis of the timeline bar 110 may be zoom-displayed at around the user-touched position (one-dimensional fisheye effect on the X-coordinate).

Alternatively, as shown in FIG. 3B, both the X and Y-axes of the timeline bar 110 may be zoom-displayed at around the user-touched position (two-dimensional fisheye effect on the X/Y-coordinates). In this case, the timeline bar area may be further zoomed, compared to in the zoom display method in FIG. 3A, facilitating easy interaction. It should be noted that although FIG. 3 shows a round fisheye effect for illustrative purposes, other shapes of zoom effect can be used according to the teaching of the present invention. Thus, the illustration of round shape in the drawing should not impose limitations on the scope of the invention.

Alternatively, the user-touched position and its adjacent area may be zoom-displayed in accordance with a circular fisheye lens effect as shown in FIG. 3C.

As is apparent from the foregoing, the user may search for his or her desired content frame more finely using the timeline bar 110 zoom-displayed in various different ways as shown in FIG. 3.

In addition, the slider fine-tuning effects may be more increased by subdividing the slide position adjustment unit depending on the display zoom ratio as described above.

Figure 4:
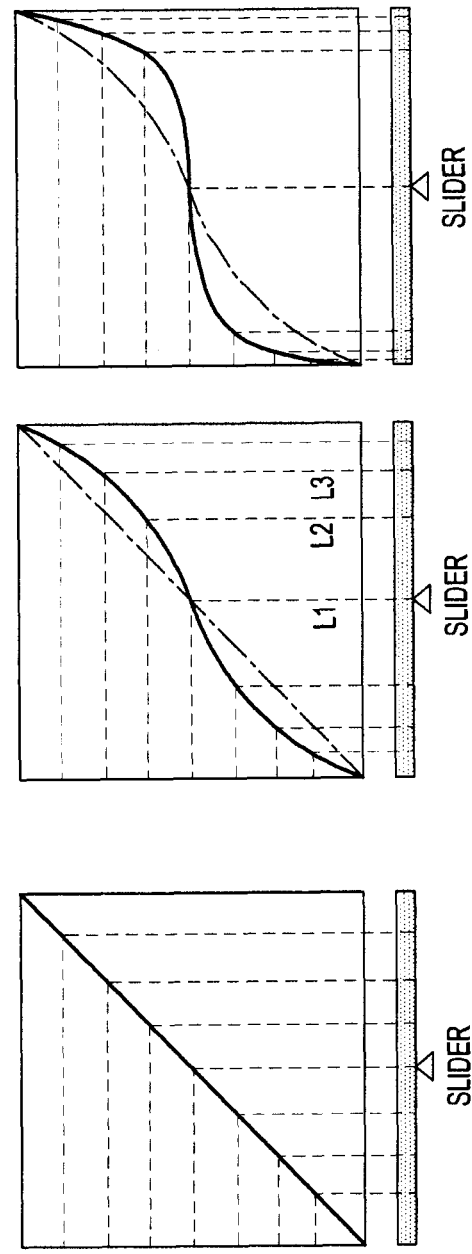
FIG. 4 shows an example of application of zoom display effects according to an embodiment of the present invention.
Figure 5:
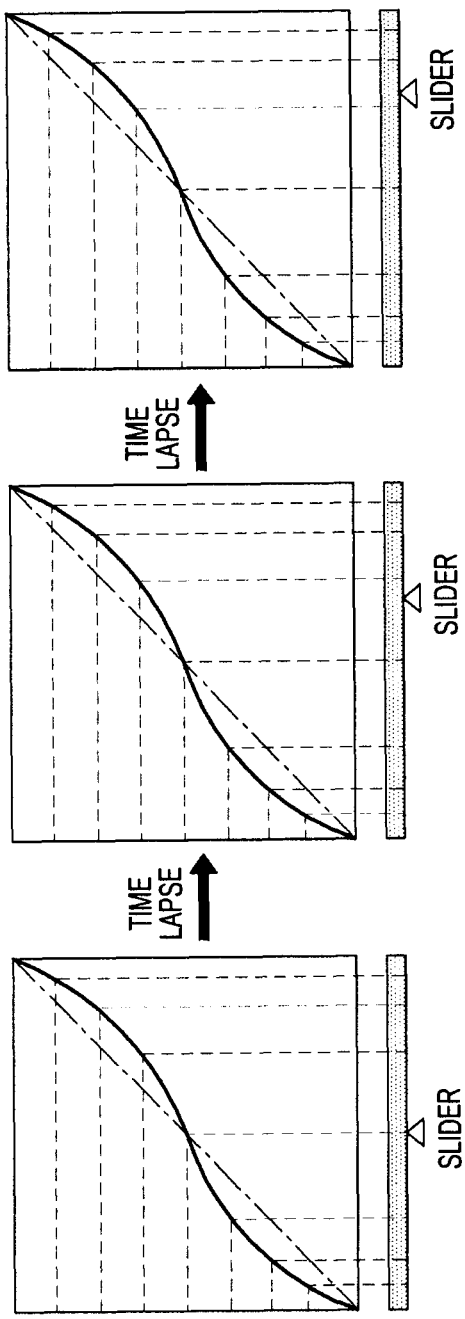
FIG. 5 shows an example of adjustment of slider position when zoom display effects are applied, according to an embodiment of the present invention.
Figure 6:
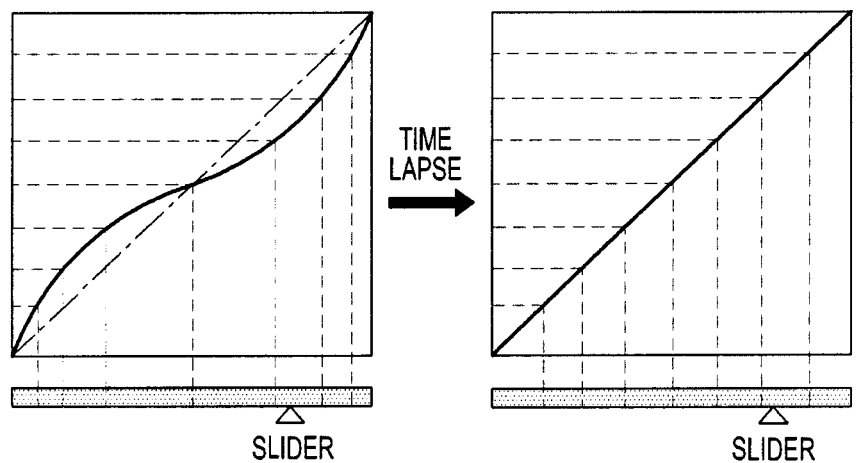
FIG. 6 shows an example of release of zoom display effects according to an embodiment of the present invention.

In order to facilitate an understanding of this invention, FIGS. 4 to 6 show operation method for applying zoom display effects according to an embodiment of the present invention.

Referring to FIG. 4, if the user's fingertip continuously touches a specific position or location on or near the timeline bar 110, zoom display effects are gradually applied to the user-touched position to generate an enlarged view or scale of the contacted area. A gap between unit lines L1, L2 and L3 corresponds to the slider adjustment interval.

It can be understood from FIG. 4 that the gap between the unit lines L1, L2 and L3 is expanded starting at the slider 120 on the timeline 130, and the farther away from the slider 120, the less the zoom display effects. In addition, it will be understood that the longer the user touch duration on the touch screen 100, the greater the zoom display effects.

Referring next to FIG. 5, after the gap between the unit lines L1, L2 and L3 on the timeline bar 110 is expanded to a desired level, the user may arbitrarily adjust the slider position by dragging the slider 120. The term 'drag' as used herein may refer to a user's gesture of shifting a touch input means such as a fingertip, while maintaining his or her contact on the screen. Note that the scale of the timeline 130, through which the slider 120 is shifted, has already been changed depending on the expansion of the timeline 130. Thus, it can be understood from FIG. 5 that as the timeline 130 is zoom-displayed, a change in the position of content by the same-distance drag is reduced, thus making it possible to precisely control the content playback position.

Finally, referring to FIG. 6, if the touch is released after a drag of the slider 120, i.e., if the user's fingertip is lifted away from the touch screen 100, the touch signal is no longer maintained, thus causing to remove the applied zoom display effects. In an alternate embodiment, the zoom display effects may be removed gradually for their reuse by the user.

Figure 7:
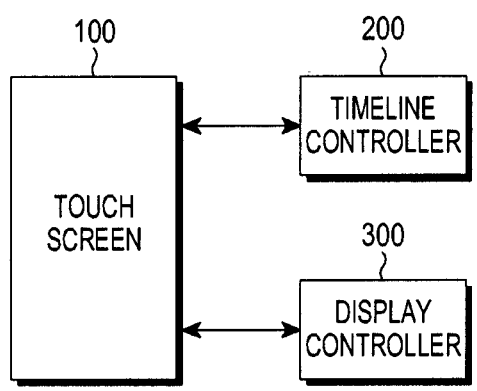
FIG. 7 shows a structure of a touch screen control apparatus according to an embodiment of the present invention.

FIG. 7 shows a structure of a touch screen control apparatus according to an embodiment of the present invention.

Referring to FIG. 7, the touch screen control apparatus includes a touch screen 100, a timeline controller 200, and a display controller 300. The timeline controller 200 displays a timeline on the touch screen 100, and synchronizes a slider position on the timeline with a content playback position. If the user touches a specific position on the timeline for a predetermined time or more, the display controller 300 zoom-displays the user-touched position, enabling a slider fine-tuning operation. In alternate embodiment, the time controller 200 and the display controller 300 may be integrated into a single controller.

In sum, the proposed touch screen control apparatus arbitrarily zoom-displays a specific position on the timeline bar using the above-described touch screen control method, making it possible for the user to more easily fine-tune the slider position for a better control of the content being replayed.

As a result, the change in the position of content by the shift of the slider is reduced and provides more precise slider manipulation, thus making it possible to precisely control the content with an easy of application of a large touch screen in a small touch screen. In addition, because the timeline is expanded logically with the increase of contact duration without physical size changes in the timeline interface, it is possible for the user to enjoy the zoom display effects without leaving the component area of the timeline interface and without many user interactions.

The above-described methods according to the present invention can be implemented in hardware, firmware or as software or computer code that can be stored in a recording medium such as a CD ROM, an RAM, a floppy disk, a hard disk, or a magneto-optical disk or computer code downloaded over a network originally stored on a remote recording medium or a non-transitory machine readable medium and to be stored on a local recording medium, so that the methods described herein can be rendered in such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for controlling a playback of content by using a timeline, comprising:
    displaying the timeline which is synchronized with the content on a display;
    in response to detecting a touch input to the timeline, upscaling a display zoom ratio for a partial area of the timeline while the touch input is maintained and stationary, wherein the partial area includes a position where the touch input is received;
    in response to detecting movement of the maintained touch input along the timeline, terminating upscaling and maintaining a present display zoom ratio of the partial area, and retrieving a portion of the content for display according to the movement of the maintained touch input; and
    in response to detecting release of the touch input from the timeline, reverting the partial area to an original display ratio before the upscaling.

2. The method of claim 1, wherein the upscaling comprises selectively upscaling the partial area of the timeline using one of: a one-dimensional fisheye effect, a two-dimensional fisheye effect, and a circular fisheye lens effect.

3. The method of claim 1, wherein the touch input is made based on a contact pressure being greater than a predetermined pressure level.

4. The method of claim 1, wherein the upscaling comprises subdividing a slide position adjustment unit of the timeline proportionally to an upscale ratio.

5. The method of claim 1, wherein the upscaling comprises gradationally reducing and displaying distances between slide position adjustment units of an x-axis included in the area.

6. The method of claim 1, wherein the upscaling comprises adjusting a slide position adjustment unit on the timeline depending on a frame size of the content.

7. The method of claim 1, wherein the touch input is made on a timeline to generate an upscaled bar.

8. The method of claim 1, wherein reverting the partial area to the original display ratio further comprises:
reducing the present zoom ratio gradually until the original display ratio is achieved; and
in response to detecting a second touch input to the timeline, terminating reduction of the present zoom ratio.

9. An apparatus, comprising:
a display allowing a playback of content using a timeline-based interface displayed thereon, and including a touch sensitive surface configured to receive a touch input on the displayed timeline; and
at least one processor, configured to:
in response to detecting the touch input to the timeline, upscale a display zoom ratio for a partial area of the timeline while the touch input is maintained and stationary, wherein the partial area includes a position where the touch input is received,
in response to detecting movement of the maintained touch input along the timeline, terminate upscaling to maintain a present display zoom ratio of the partial area, and retrieve a portion of the content for display according to the movement of the maintained touch input, and
in response to detecting release of the touch input from the timeline, revert the partial area to an original display ratio before the upscaling.

10. The apparatus of claim 9, wherein the at least one processor is configured to selectively upscale the partial area of the timeline based on any one of: a one-dimensional fisheye effect, a two-dimensional fisheye effect, and a circular fisheye lens effect.

11. The apparatus of claim 9, wherein the at least one processor is further configured to subdivides a slide position adjustment unit proportionally to an upscale ratio.

12. The apparatus of claim 9, wherein the at least one processor is further configured to gradationally reduce and display distances between slide position adjustment units of an x-axis included in the area.

13. The apparatus of claim 9, wherein the at least one processor is configured to adjusts a slide position adjustment unit depending on a frame size of the content.

14. A system, comprising:
a touch screen configured to receive touch inputs;
at least one processor; and
a computer readable storage medium coupled with the at least one processor, wherein the at least one processor configured to:
display on a display at least a portion of content and a timeline which is synchronized with the content;
in response to detecting a touch input on the displayed timeline, upscale a display zoom ratio of a partial area of the timeline while the touch input is maintained and stationary, wherein the partial area includes a position where the touch input is received,
in response to detecting movement of the maintained touch input along the timeline, terminate upscaling to maintain a present display zoom ratio of the partial area, and retrieve a portion of the content for display according to the movement of the maintained touch input, and
in response to detecting release of the touch input from the timeline, revert the partial area to an original display ratio before the upscaling.

15. The system of claim 14, wherein:
the at least one processor is configured to selectively upscale the partial area of the timeline based on any one of: a one-dimensional fisheye effect, a two-dimensional fisheye effect, and a circular fisheye lens effect;
wherein the at least one processor is configured to gradationally reduce and display distances between slide position adjustment units of x-axis included in the partial area.

16. The system of claim 14, wherein the touch input comprises one of: a predetermined gesture pattern, a touch input pressure greater than a predetermined pressure level, multiples of the touch input received that are substantially the same within a predefined time period, and responsive to user interaction including an activation of a request button.

17. The system of claim 14, wherein the at least one processor is configured to generate an upscaled bar when the touch input is made on the timeline.

18. The method of claim 1, wherein upscaling the display zoom ratio comprises:
increasing the display zoom ratio of the partial area in proportion to a length of time the touch input is maintained and stationary, wherein a rate at which the display zoom ratio increases is adjusted according to a resolution size of the content, such that the rate is higher for a higher resolution size.

19. The apparatus of claim 9, wherein upscaling the display zoom ratio comprises:
increasing the display zoom ratio of the partial area in proportion to a length of time the touch input is maintained and stationary, wherein a rate at which the display zoom ratio increases is adjusted according to a resolution size of the content, such that the rate is higher for a higher resolution size.

20. The system of claim 14, wherein upscaling the display zoom ratio comprises:
increasing the display zoom ratio of the partial area in proportion to a length of time the touch input is maintained and stationary, wherein a rate at which the display zoom ratio increases is adjusted according to a resolution size of the content, such that the rate is higher for a higher resolution size.

* * * * *

UNITED STATES PATENT AND TRADEMARK OFFICE
CERTIFICATE OF CORRECTION

PATENT NO. : 9,311,965 B2  
APPLICATION NO. : 13/483357  
DATED : April 12, 2016  
INVENTOR(S) : Sung-Jae Hwang Page 1 of 1

It is certified that error appears in the above-identified patent and that said Letters Patent is hereby corrected as shown below:

In the Claims

Column 7, Claim 11, Line 45 should read as follows:
--...to subdivide a slide...--

Column 7, Claim 13, Line 52 should read as follows:
--...to adjust a slide...--

Signed and Sealed this  
Seventh Day of June, 2016

Michelle K. Lee  
*Director of the United States Patent and Trademark Office*